March 13, 1934.  L. J. BUTTOLPH  1,951,128
SUPPORT FOR ELECTRIC DEVICES
Filed Dec. 27, 1929   2 Sheets-Sheet 1
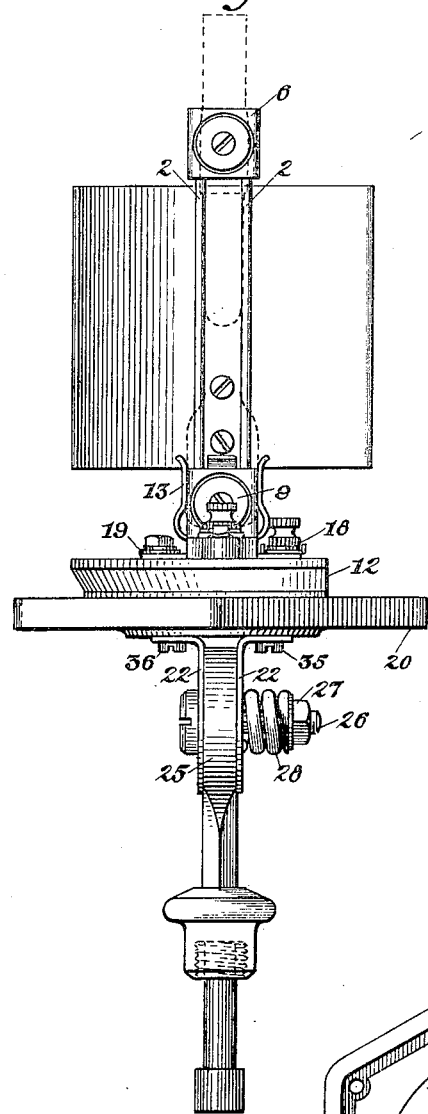
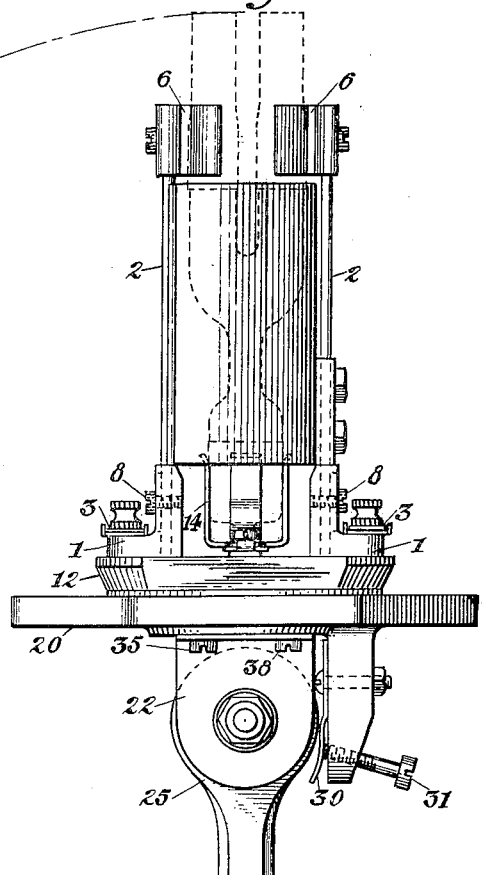
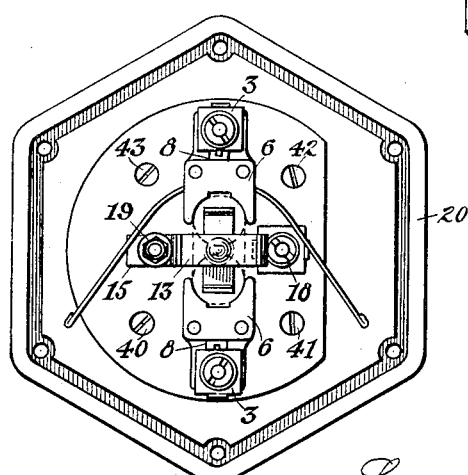
INVENTOR
Leroy J. Buttolph
BY Thos. E. H. Brown
HIS ATTORNEY March 13, 1934.   L. J. BUTTOLPH   1,951,128
SUPPORT FOR ELECTRIC DEVICES
Filed Dec. 27, 1929   2 Sheets-Sheet 2

INVENTOR
Leroy J. Buttolph
BY
Thos. H. Brown
HIS ATTORNEY

Patented Mar. 13, 1934

1,951,128

UNITED STATES PATENT OFFICE 1,951,128

SUPPORT FOR ELECTRIC DEVICES

Leroy J. Buttolph, Grantwood, N. J., assignor to General Electric Vapor Lamp Company, Hoboken, N. J., a corporation of New Jersey Application December 27, 1929, Serial No. 416,932

4 Claims. (Cl. 173—328)

The present invention relates generally to electric discharge devices and particularly the invention relates to means and apparatus for supporting such devices and making electrical connections therewith.

It is an object of this invention to provide a housing and supporting apparatus of compact structure and of great simplicity for an electric discharge device and the electrical connections therefor. A further object of the invention is to provide such an apparatus into which an electric discharge device can be introduced and withdrawn therefrom with great facility.

In accordance with the object of the invention the apparatus comprises a housing, an electric discharge device, such as a mercury vapor lamp, and anode and cathode electrically conducting resilient supports for said device which are insulated from each other and from the housing.

In the drawings accompanying and forming part of this specification two embodiments of the invention are shown for purposes of illustration, in which Fig. 1 is a front elevational view of one embodiment of the invention and a mount therefor, the position of an electric discharge device therein being shown by dotted lines.

Fig. 2 is a side elevational view of the same embodiment of the invention, a mount therefor, the position of an electric discharge device therein being shown by dotted lines.

Fig. 3 is a plan view of the same embodiment of the invention and a mount therefor, the position of an electric discharge device therein being shown by dotted lines.

Like reference characters denote like parts in all views of the invention.

Figure 4:
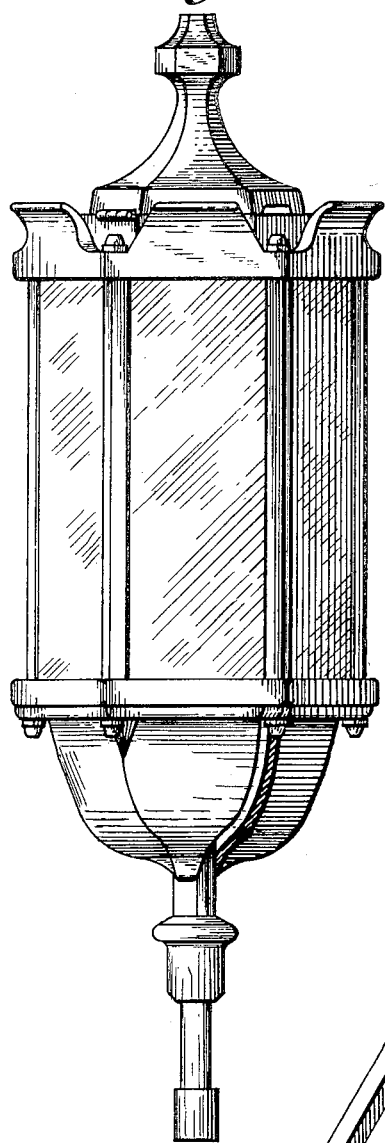
Fig. 4 is a side elevational view of a suitable housing for the outfits, and in this instance conforming to the geometric configuration shown in Fig. 6.

Referring to Figs. 1, 2 and 3 of the drawings, the anode supports consist of base parts 1, 1 provided with electrical connections 3, 3. Said base parts 1, 1 are firmly attached to insulating plate 12 by bolts. Said insulating plate 12 is attached to base plate 20 by bolts 40, 41, 42, 43 as shown in Fig. 3. Two parallel resilient rods 2, 2 are clamped in each of said base parts by washers 9, 9 and bolts 8, 8 as shown in Figs. 1 and 2. Contact members 6, 6 are clamped to the opposite ends of said rods 2, 2 in like manner. Said contact members 6, 6 have concave inner surfaces with a groove running down the center thereof, shown in Fig. 3, in order to fit the convex surfaces of the anode members of the discharge device and to make a two point electrical contact therewith.

The cathode support consists of two U shaped members 13, 14 set at right angles to each other, as in Figs. 1, 2 and 3 and riveted to strip 15. Said strip 15 is provided with electrical connection 18 and is bolted to insulating plate 12 at 18 and 19. The arms of said U shaped members 13, 14 are flexible enough to permit the introduction and removal of the cathode chamber, yet resilient enough to hold said chamber in position.

Having this structure the apparatus can be used with great advantage in any housing for a discharge device as, for example, that shown in Fig. 4. Said device is easily removable from the top of such housing and apparatus without loosening any of the electrical connections or parts of said apparatus. Laying back the hinged top of said housing, spreading apart the two resilient anode supports of the apparatus and pulling slightly upward on the anode stems of the discharge device is sufficient for this operation. The introduction therein of a discharge device is obviously as simple an operation. A further advantage attaching to this apparatus is in the location of all electrical connections in a very small space at the bottom thereof, thus eliminating many wiring difficulties resulting from scattered electrical connections.

Figure 5:
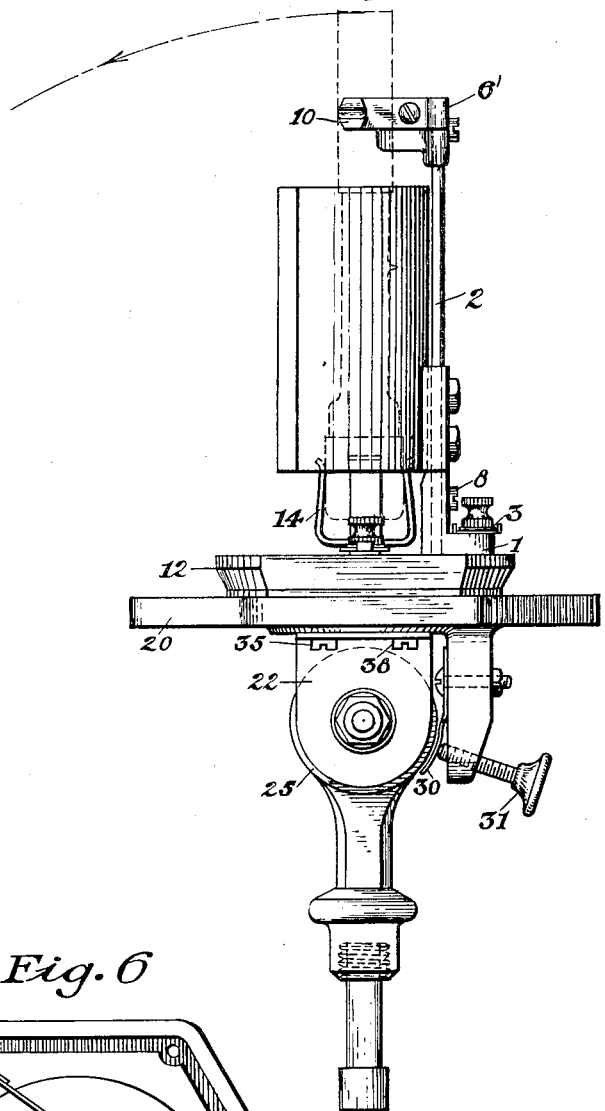
Fig. 5 is a side elevational view of a second embodiment of the invention and a mount therefor, the position of an electric discharge device therein being shown by dotted lines.
Figure 6:
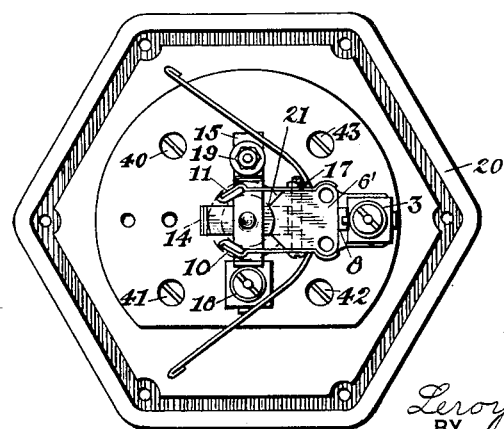
Fig. 6 is a plan view of the second embodiment of the invention and a mount therefor, the position of an electric discharge device therein being shown by dotted lines.

The embodiment of the invention shown in Figs. 5, 6 is adaptable for use in connection with electric discharge devices having a single anode member, such as those operating on direct current. In this embodiment of the invention the cathode support is in all respects similar to that shown in Figs. 1, 2, 3. The single anode support differs only in the anode contact member 6'. Said contact member 6' has resilient members 10, 11 attached thereto by bolt and nut 17 as shown in Fig. 6. Said resilient members 10, 11 extend beyond the mid-line of the anode member of the discharge device and have contact parts at the ends thereof adapted to press against said anode member thus holding it in position against the concave surface of contact member 6'. Having this structure said contact member 6' makes a three point electrical contact with the anode member of the electric discharge device.

This embodiment also permits the introduction and removal of a discharge device from the top of the housing shown in Fig. 4 and from the apparatus, a slight horizontal pressure and a slight vertical pressure exerted manually being sufficient for this purpose.

Both these embodiments of the invention have great utility when used in a housing such as shown in Fig. 4 having its only opening in the top thereof, or when used in any other suitable structure of limited space.

The mount for the housing and the apparatus illustrated in Figs. 1, 2 and 5 is adapted to tilt in the direction indicated in Figs. 2 and 5. This facilitates the starting of the mercury vapor discharge device held in the apparatus, as well as permitting the light emitted from such device to be directed through any degree from the horizontal downward to the vertical. To this end the mount comprises a base 20 to which is bolted insulating plate 12 and the housing shown in Fig. 4. Said base plate 20 has a frictional joint attached thereto by bolts 35, 36, 37, 38. Said frictional joint comprises thin flexible flanges 22, 22 and tongue 25. Said tongue 25 has a thin portion at the center thereof around the hole accommodating bolt 26. When pressure is exerted on each of the two flanges by tightening nut 27, thus compressing spring 28, said flanges are forced against the broad rim surfaces of tongue 25. Having this structure said frictional joint will maintain the superstructure at any desired angle from the vertical to the horizontal, shoe 30 and set screw 31 being provided merely as a precaution against any severe physical shocks.

While I have shown and described and have pointed out in the annexed claims certain novel features of the invention, it will be understood that various omissions, substitutions and changes in the forms and details of the devices illustrated and in its use and operation may be made by those skilled in the art without departing from the spirit of the invention.

I claim:

1. A compact unitary connector support for an electric discharge device having two anode members and one cathode member comprising a plate of insulating material, resilient, electrically conducting anode supports adapted to fit and press laterally against the anode members of said electric discharge device and a resilient, electrically conducting cathode support adapted to fit and press laterally against the cathode member of said electric discharge device, said supports being spaced apart and secured on said plate.

2. A compact unitary connector support for an electric discharge device having two anode members and one cathode member comprising a plate of insulating material, anode supports having a base equipped with an electrical connection, one or more resilient members extending from said base and a contact member at the opposite end of said resilient member adapted to fit and make electrical connection with the side of one of the anode members of said electric discharge device, and a cathode support having an electrical connection, two resilient U shaped members adapted to fit and make electrical connection with the cathode member of said electric discharge device, said supports being spaced apart and secured on said plate.

3. A compact unitary connector support for an electric discharge device having a single anode and a single cathode comprising a plate of insulating material, an anode support having two resilient clip members adapted to fit and make electrical connections with the anode member of the discharge device and a resilient electrically conducting cathode support adapted to fit and make electrical connections with the cathode member of said device, said supports being spaced apart and secured on said plate.

4. A compact unitary connector support for an electric discharge device having a single anode and a single cathode comprising a plate of insulating material, an anode support having a base equipped with an electrical connection, one or more resilient members extending from said base, a contact member on the opposite end of said resilient member, said contact member being equipped with two resilient clip members, and being adapted to fit and make electrical connections with the anode member of the discharge device and a cathode support comprising two U shaped members adapted to fit and make electrical connections with the cathode member of said device, said supports being spaced apart and secured on said plate.

LEROY J. BUTTOLPH.